United States Patent [19]

Moore

[11] Patent Number: 5,202,078
[45] Date of Patent: Apr. 13, 1993

[54] PROCESS AND APPARATUS FOR MANUFACTURING CONTAINERS WITH THICKENED FLANGES AND LONGITUDINAL REINFORCING RIBS AND CONTAINERS THEREBY

[75] Inventor: Richard L. Moore, Fairhope, Ala.

[73] Assignee: Lerio Corporation, Mobile, Ala.

[21] Appl. No.: 792,938

[22] Filed: Nov. 15, 1991

[51] Int. Cl.$^5$ .............................................. B29C 49/00
[52] U.S. Cl. .................................. 264/527; 264/534; 425/525
[58] Field of Search ........................ 264/527, 531, 534; 425/525, 532

[56] References Cited

U.S. PATENT DOCUMENTS

| | | | |
|---|---|---|---|
| 3,843,005 | 10/1974 | Uhlig | 215/1 C |
| 4,117,062 | 9/1978 | Uhlig | 264/94 |
| 4,170,622 | 10/1979 | Uhligh | 264/520 |
| 4,170,623 | 10/1979 | Dubois et al. | 264/534 |
| 4,177,934 | 12/1979 | Hammes et al. | 220/319 |
| 4,378,328 | 3/1983 | Przytulla et al. | 264/534 |
| 4,409,176 | 10/1983 | Jakobsen et al. | 264/527 |
| 4,495,135 | 1/1985 | White | 264/553 |
| 4,529,570 | 7/1985 | Przytulla | 264/534 |
| 4,640,855 | 2/1987 | St. Clair | 428/36 |
| 4,650,627 | 3/1987 | Peters | 264/529 |
| 4,713,207 | 12/1987 | Udell et al. | 264/515 |
| 4,761,130 | 8/1988 | Peters | 425/532 |
| 4,769,206 | 9/1988 | Reymann et al. | 264/534 |
| 4,842,802 | 6/1989 | Przytulla | 264/530 |
| 4,972,963 | 11/1990 | Guarriello et al. | 220/72 |
| 5,026,268 | 6/1991 | Lee | 425/525 |
| 5,051,084 | 9/1991 | Guarriello et al. | 264/534 |

FOREIGN PATENT DOCUMENTS

| | | | |
|---|---|---|---|
| 49-45797 | 12/1974 | Japan | 425/525 |
| 59-152822 | 8/1984 | Japan | 264/534 |
| 61-100433 | 5/1986 | Japan | 264/531 |

*Primary Examiner*—Jan H. Silbaugh
*Assistant Examiner*—Catherine Timm
*Attorney, Agent, or Firm*—Fisher, Christen & Sabol

[57] ABSTRACT

An apparatus for producing blow-molded containers having thickened flanges. The apparatus utilizes major mold halves and a plurality of minor mold elements disposed within the mold halves to form containers having thickened flanges. The minor mold elements move radially relative to the mold halves and the joined pair of containers. While the blow-molded material is still moldable, the minor mold elements move radially inward to fold and bond the material onto itself, forming a pair of thickened radial flanges on each container. The flanges are each substantially twice as thick as a single layer of blow-molded material. Longitudinally-oriented reinforcing ribs are formed at the interstices of the minor mold elements which link the two thickened flanges and further strength the containers. By allowing the mold halves to remain substantially still during the blow-molding process, the tab of material formed at the junction of the mold halves opposite to the feed end of the blow-molding chamber is preserved, thereby facilitating post-processing handling of the containers. The minor mold elements may be oriented at different angles relative to the mold chamber to produce two flanges of differing configurations on each container.

10 Claims, 5 Drawing Sheets

PROCESS AND APPARATUS FOR MANUFACTURING CONTAINERS WITH THICKENED FLANGES AND LONGITUDINAL REINFORCING RIBS AND CONTAINERS THEREBY

BACKGROUND OF THE INVENTION

1. Field of the Invention

The present invention relates, in general, to the formation of containers having thickened flanges. More specifically, the present invention discloses a process and apparatus for manufacturing blow-molded containers having thickened flanges and longitudinally-oriented reinforcing ribs. Containers produced by the inventive process and apparatus are also disclosed.

2. Description of Related Art

Typically, blow-molding processes call for suspension of a heated tube or parison of thermoplastic material between two mold halves. The mold halves are closed on the suspended parison, then an expanding medium (e.g., air) at super atmospheric pressure is introduced into the tube. Alternatively, the mold may be evacuated, i.e., via vacuum, or both blow-molding pressure and vacuum may be combined so that the material of the tube eventually conforms to the contour of the mold. The mold is generally much cooler than the thermoplastic material, and hence, the thermoplastic material becomes rigid or "sets" after being in contact with the mold for a short period of time. Once the thermoplastic material sets, the mold halves are opened and the part is removed.

Owing to the particular qualities of previously-known blow-molding process, the open-top containers produced thereby have not possessed a very rigid rim or top section. This has been particularly true with those containers with continually outwardly and upwardly tapering side walls wherein the top or rim constitutes the largest part of the container. In order to augment the strength of the top rim, conventional containers have been formed having an annular projection at the top thereof; the projection having a generally channel-shaped or multiple channel shaped cross section. This channel shaped cross section, although beneficial, often does not provide the rigidity required in many applications. Furthermore, the channel shaped section is located at the largest radial dimension of the mold where parison stretch is the greatest. For example, U.S. Pat. No. 4,972,963 to Guarriello et al. discloses a blow-molded article with a reverse lip. As shown in FIG. 3, the "reversed lip" refers to a generally U-shaped member which, by its shape, provides somewhat increased strength to the top of the container. The reversed lip has the same thickness as the rest of the container, however, i.e., one layer of blow-molded material.

In order to provide flanges having strength beyond the limits possible with a single thickness of blow-molded material, a variety of methods for producing thickened flanges have been developed. For example, in U.S. Pat. No. 4,713,207 to Udell et al. a process for producing blow-molded containers (e.g., drums) having thickened flanges and/or chimes is disclosed. The process calls for a ring of extrudate (E) to be placed in the mold before the parison (P) is extruded into the mold chamber. In this way, as the parison is blow molded, the extrudate (E) and parison (P) materials may bond together.

Placing two different materials within the mold chamber is time consuming and expensive, however. Therefore, other processes have been developed which form a thickened flange from a single parison of material. For example, U.S. Pat. No. 4,117,062 to Uhlig discloses a process for producing containers (e.g., drums) having thickened chimes and/or flanges. In this process, the mold chamber is configured to keep certain parts of the blow-molded container warmer than others (i.e., those sections which will be refolded). After the parison of thermoplastic material has been expanded, the desired portions of material are refolded to form flanges/chimes by axially moving the ring (26) (see, FIGS. 3–7). It does not appear that the layers of blow-molded material bond together after being folded over, however, and the simultaneous formation of two containers is not disclosed.

In other processes, the folded over layers of blow-molded material are substantially fused together, thereby increasing the strength of the flange. For example, in U.S. Pat. No. 3,843,005 to Uhlig (which is hereby incorporated by reference), the folded over layers may be bonded together by residual heat (see, e.g., column 11, lines 33–37). In this process (as is common in the prior art), however, the thickened flange (e.g., bottom support wall (99) in FIG. 3) is formed by moving one major mold section relative to another (e.g., plates (84) in FIGS. 15–17) in an axial direction, thereby moving a substantial portion of the mold and container. Since the molds are often quite heavy, this movement can be energy-intensive and wasteful. Furthermore, as shown in FIGS. 15–17, moving the major mold components often severs the "tail" (85) of thermoplastic material pinched between the mold sections. Severing the tail (85) is detrimental since this makes it more difficult to handle the container after it is released from the mold without marring its surface.

Other processes have been developed wherein thickened flanges are formed by the movement of major mold sections. For example, U.S. Pat. No. 5,026,268 to Lee discloses an apparatus for forming blow-molded containers having thickened flanges by folding over the thermoplastic material. The blow-molded material is folded over by the relative motion of three longitudinally-arranged major mold sections (36, 38, 40).

A few attempts have been made to develop processes which utilize radial motion of mold components. For example, U.S. Pat. No. 4,769,206 to Reymann et al. ("Reymann") discloses a method for producing a hollow body provided with a stand ring by blow-molding. Reymann teaches the use of a sectioned mold cavity. Reymann appears to show mould sections (15, 16) which are moved radially (i.e., rather than axially), but these mould sections are only moved outwardly to allow the axially-movable bottom mould section (14) to decent further (see, FIG. 6) to form a turned-back bottom section on the bottle. Furthermore, the turning-back operation disclosed by Reymann does not appear to create any substantially thickened areas in the molded material (in fact, see column 4, lines 23–27, some stretching—i.e., thinning—of the material appears to be envisioned).

U.S. Pat. No. 4,761,130 and 4,650,627 to Peters ("Peters I and II") disclose a method and apparatus for blow-molding. Peters I and II teach forming containers with reinforced edges by moving the sides of the mould container inwardly to form thickened edges (see FIG. 6). This movement is described as "radial" (see, column 5, lines 60-64—i.e., relative to the longitudinal axis of the container (192)). In Peters I and II, however, the whole of the mold sides move (not just a separate flange-forming component). Also, Peters I and II concern rectangular, not cylindrical containers.

Finally, U.S. Pat. No. 4,495,135 to White ("White") discloses a method for forming containers having re-entrant flanges. White teaches the use of gate assemblies (41) having leading ends (3a) to form flanges on containers (especially flanges having an undercut top lip). As illustrated in FIGS. 4-6, after the container has been molded, White appears to call for the leading ends (3a) of the gate assemblies (41) to be retracted radially (i.e., perpendicularly relative to the longitudinal axis of the container), but does not teach any secondary compaction of the formed material to form a thickened flange. Also, White involves formulation of containers from thermoplastic sheet material, not blow-molding.

While these methods are capable of producing very useful containers, the problem of producing blow-molded containers having thickened flanges and longitudinal reinforcing ribs, the layers of which reliably bond together, without relying upon movement of major mold sections has remained. Furthermore, the corollary problem of post-release (i.e., from the mold chamber) handling of the container also remains unsolved, i.e., in light of the tendency of present processes to remove the "tail" of extruded thermoplastic material pinched between the mold sections.

SUMMARY OF THE INVENTION

The inventive process and apparatus solve the problems and suboptimizations of the prior art by producing an open-top container which has a body portion, a pair of radially outwardly extending flanges disposed at the top of, and integral with, the body portion and a series of longitudinally-oriented reinforcing ribs joining the radial flanges to each other and to the body of the container. The containers are blow-molded two per mold in a mold which has at least one major or fixed mold element and a plurality of movable/minor internal mold elements. The fixed mold elements provide two chambers which substantially conform to the body and bottom of each container.

The minor mold elements are mounted within the major mold elements for displacement in a radial direction with respect to the mold chamber. The inwardmost surfaces of the minor mold elements comprise the primary component of the outer-most vertical or axial portion of a channel-shaped annular projection within each container. When the parison is inflated and conforms substantially to this channel-shaped projection, but while the plastic is still flowable, the radial minor mold elements are moved inwardly, converging toward the axial centerline of the mold. This movement displaces the material of the channel-shaped annular projection, i.e., axially below the top radial section of the channel-shaped projection and axially above the bottom radial section of the channel-shaped annular projection. As the minor mold elements move radially inward, the top and bottom radial flanges of the annular projection become nearly double material thickness in the area of the minor mold elements. As the radial sections of the annular channel-shaped projections are folded over, the layers of material substantially bond to each other to form a pair of thickened radial flanges (i.e., one pair of thickened flanges is formed by each ring of minor mold elements, e.g., two thickened flanges per container).

As the minor mold elements move radially together, the material at the interstices of adjacent minor mold elements is compacted and forms longitudinal or axial reinforced ribs which are integral to the body of the container and integral to both the upper and lower radial flanges. Because of the radial movement of the minor mold sections (when forming cylindrical containers) the interstitial spaces between the minor mold elements are generally triangular in shape. This interstitial configuration, in turn, causes the longitudinal ribs to have a triangular or "tear drop" shaped configuration (i.e., in cross-section when viewed from a direction parallel to the longitudinal axis of the containers). That is, the longitudinal or axial ribs are thickest at the outside thereof and thinner at the innermost side (i.e., where the ribs meet the body of the container).

Once the plastic material has become rigid the minor mold elements are retracted, the major mold sections are opened and the pair of joined containers is released. Thereafter, the containers are separated and any excess material is trimmed away.

Since only small internal mold elements are used to form the thickened flanges, the tail or pinch tab formed by the closing of the mold sections on the parison of thermoplastic material (i.e., at the bottom of the container) remains connected to the containers. The pinch tab provides a convenient means for automated part (i.e., container) removal from the molding machine (e.g., by mechanical fingers grasping the tab prior to the mold opening, and then removing the containers after the mold has opened) for placement in the secondary trim machinery. Furthermore, by requiring only the minor internal mold elements to move during the process of forming the thickened flanges, the present invention requires less energy than previous-known processes/apparatuses.

BRIEF DESCRIPTION OF THE DRAWINGS

For purposes of illustrating the invention, there is shown in the drawings a preferred form of the present apparatus, process and resultant article of manufacture. It is to be understood, however, that the invention is not limited to the precise arrangements and instrumentalities shown.

DETAILED DESCRIPTION OF THE PREFERRED EMBODIMENT

Figure 7:
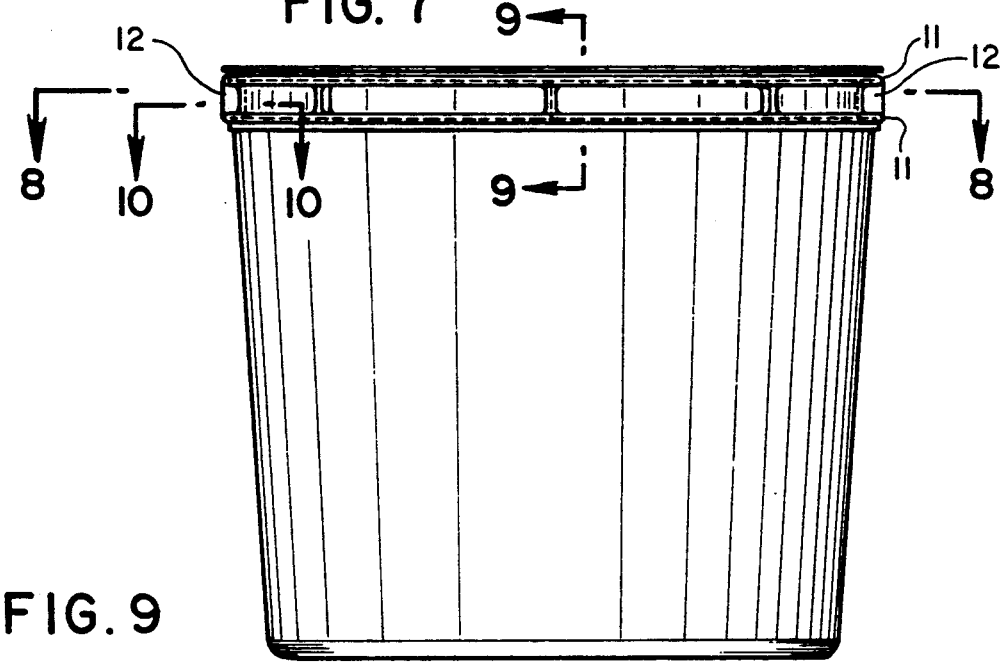
FIG. 7 is a side view of a finished container showing the pair of thickened radial flanges and several axial reinforcing ribs.

Referring to the drawings, wherein like numerals refer to like elements throughout, there is shown in FIG. 7 a container 10 made by the present process and apparatus. The container 10 may be formed from any suitable thermoplastic or thermosetting material (e.g., polypropylene, polyurethane, polyethylene, etc.) and may be formed in any suitable general configuration (e.g., round, square, etc.—preferably, however, generally cylindrical containers are formed). To facilitate recycling of scrap material, thermoplastic materials (e.g., high-density polyethylene) are preferably used. The container 10 may also be formed in a wide variety of sizes, e.g., from flower pots having a top opening of two inches square to containers for trees capable of holding several cubic yards of soil and plant material. As is known in the art, the container 10 may advantageously be formed to include ribs for strengthening the container sidewall and a raised bottom to facilitate water drainage from the container. In the case of flower pots, it may also be helpful to include holes in the bottom of the container 10 to facilitate drainage of excess water.

(a) Apparatus

The apparatus used to produce the inventive containers 10 is similar to previously-known blow-molding apparatuses (see, e.g., U.S. Pat. No. 4,713,207 to Udell et al., which is hereby incorporated by reference) in that major mold sections 20 close around a parison of flowable thermoplastic material. As the major mold sections close around the thermoplastic material, they create an enclosed mold chamber and pinch a residual "tail" of thermoplastic material (see, e.g., FIGS. 15-17 of U.S. Pat. No. 3,843,005 to Uhlig—"tail" of material (85) between the major mold elements at the junction point thereof. In Uhlig, this "tail" of material (85) is separated from the containers during processing. In the present invention, however, as will be discussed in further detail hereinafter, the tail of material pinched between the major mold sections is maintained during processing and facilitates post-processing removal of the containers 10 from the mold chamber and allows the molded containers to be handled without marring the sides thereof.

The major mold sections 20 help to cool and "set" the thermoplastic material after it is brought into contact therewith (i.e., by blow-molding, vacuum, or a combination thereof). Therefore, the major mold sections 20 are preferably made of highly heat-conductive material, e.g., aluminum. More preferably, the major mold sections 20 include internal tubing or drilled or molded passages for conveying cold water (or other fluids, e.g., glycol) therethrough to further facilitate the cooling process. As noted above (see also, FIGS. 1-3 and 3A), the major mold sections 20 are preferably separable along a longitudinal (relative to the containers being formed therein) axis. In this way, the major mold sections 20 are both openable to allow a parison of thermoplastic material to descend therebetween (e.g., from an extruder or other suitable means for producing moldable thermoplastic material as known in the art), and closable to capture the tail of material between the major mold sections (i.e., at the end of the mold chamber opposite to the side where the parison of thermoplastic material enters the mold chamber). The major mold sections 20 may also be openable along a latitudinal plane (relative to the containers being formed in the mold chamber—see, FIGS. 4 and 5), i.e., at the dividing point between the two containers 10 formed per process cycle of the apparatus. Latitudinally-divisible major mold sections are preferable from the viewpoint of machining, assembly and maintenance, but more preferably, the major mold sections 20 are not separated along a latitudinal plane during use.

In the present invention, the goal of producing a container (e.g., flower pot) with thickened (and strengthened) flanges is achieved by the radial movement of a plurality of minor mold components, and not by the movement of the major mold elements 20. This distinction over the previously-known processes allows the present process to use much less energy (i.e., since much smaller and lighter mold components are being moved). Furthermore, molding the desired thickened flanges substantially without moving the major mold sections allows the tail of material formed between the major mold sections to remain attached to the containers during formation of the thickened flanges and, once the containers have been released by the major mold sections, facilitates removal of the containers from the mold chamber and post-molding processing. This is in contrast to many previously-known processes, e.g., U.S. Pat. No. 3,843,005 to Uhlig (discussed above and hereby incorporated by reference) wherein the tail of material is usually detached from the container by the movement of the major mold sections during flange formation.

Figure 1:
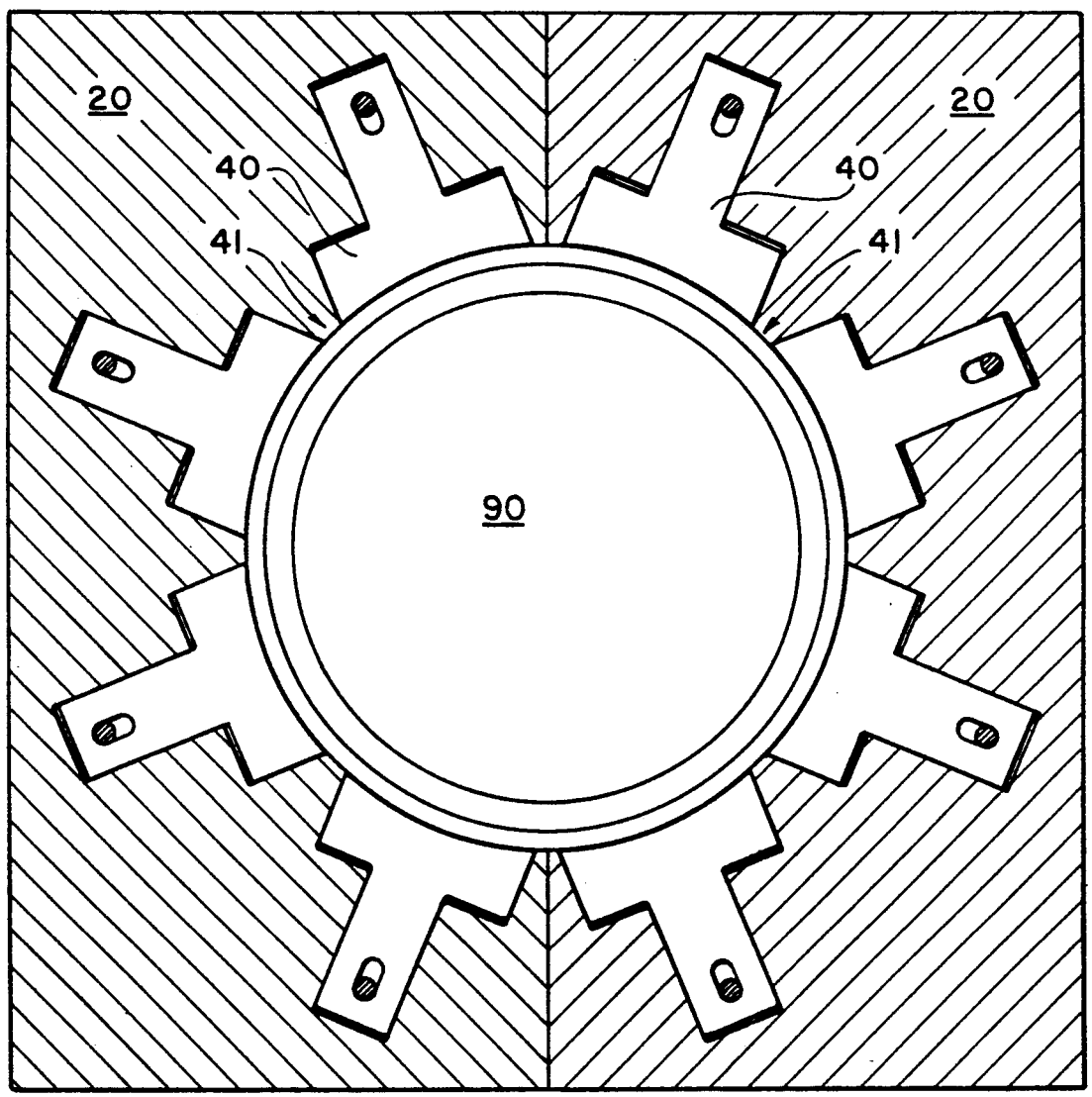
FIG. 1 is a top plan view of a mold chamber suitable for making one container showing the major and minor mold elements of the apparatus wherein the minor mold elements are fully retracted.
Figure 2:
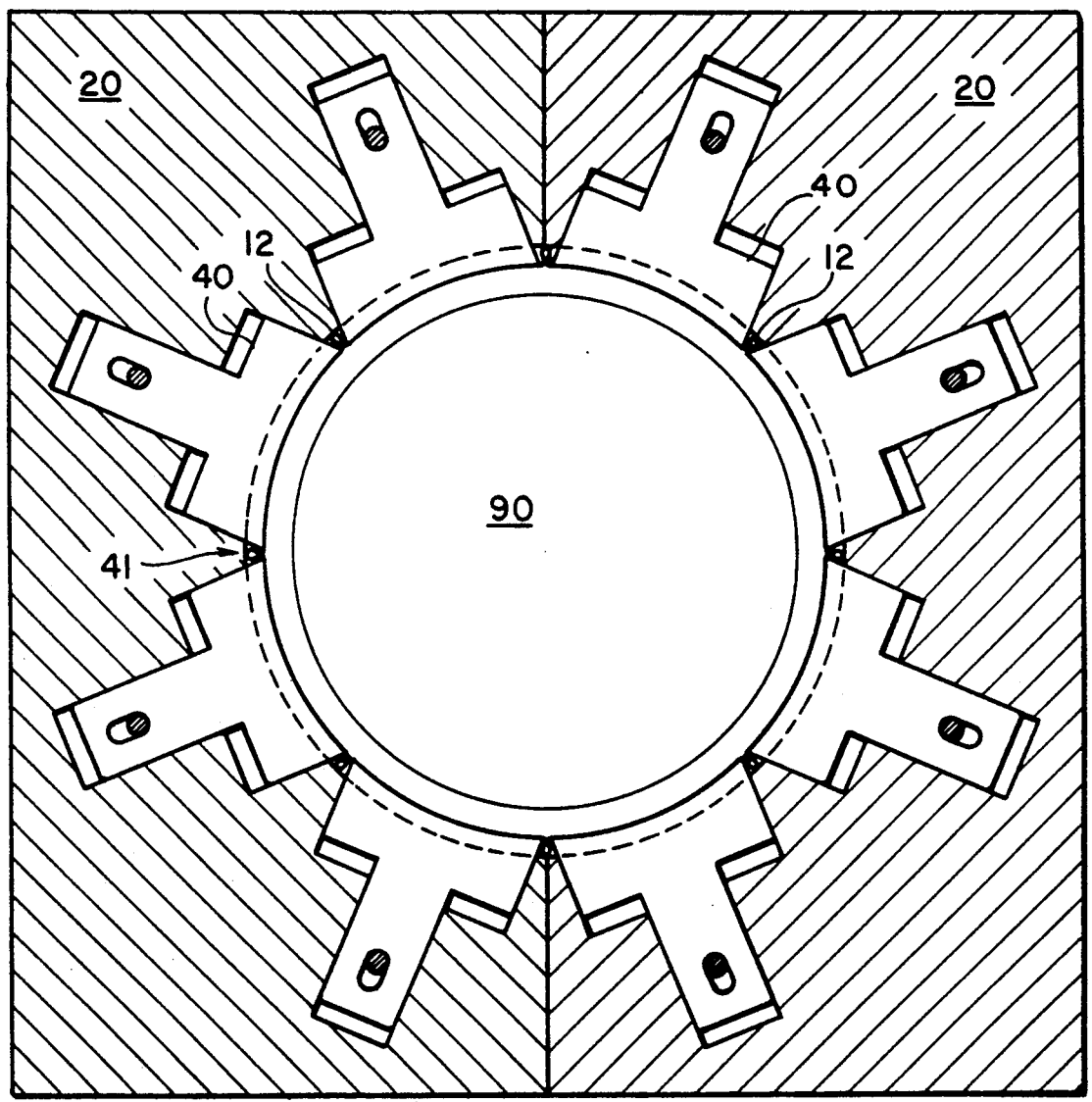
FIG. 2 is a top plan view of a mold chamber showing the minor mold elements fully extended in the radial direction and showing the formation of the axial reinforcing ribs in the interstices of the minor mold elements.
Figure 3:
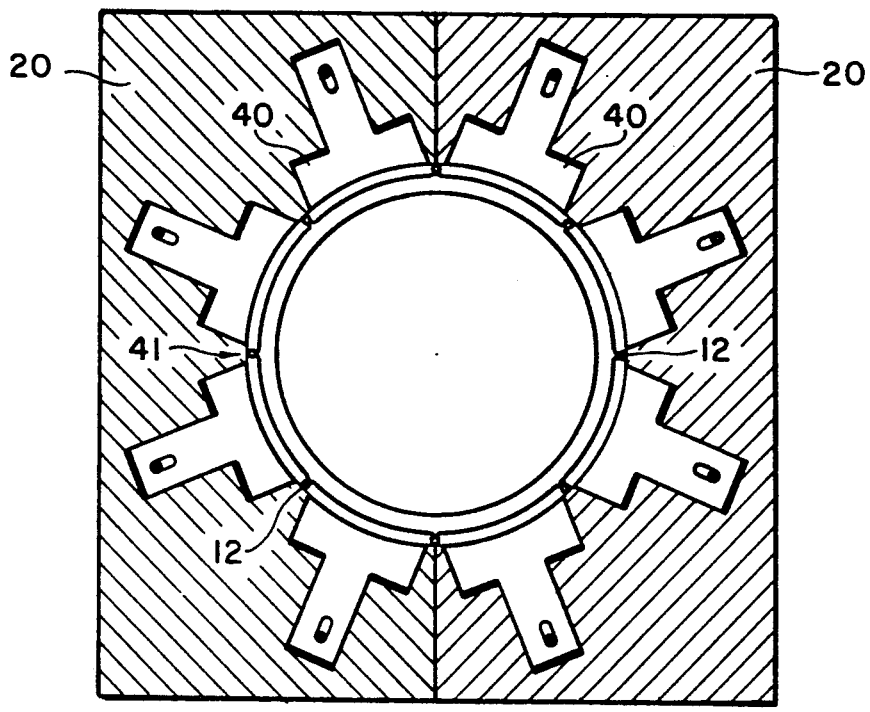
FIG. 3 is a top plan view of a mold chamber showing the minor mold elements fully retracted after the thickened flanges and axial reinforcing ribs have been formed.
Figure 3A:
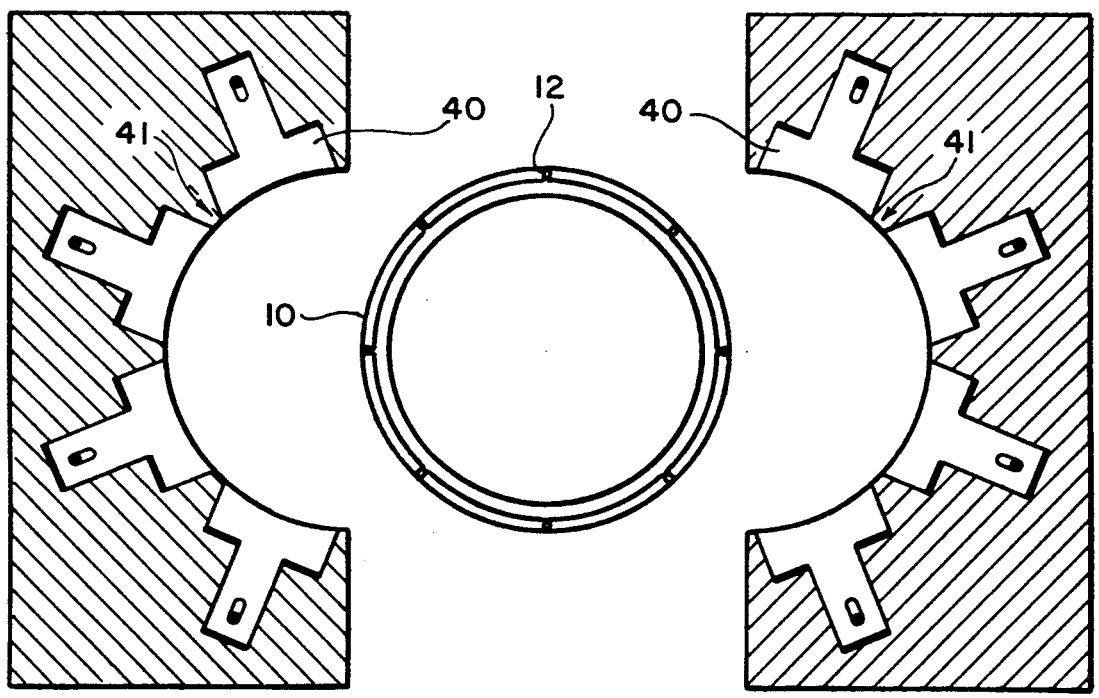
FIG. 3A is a top plan view of a mold chamber showing the major mold elements retracted/separated whereby the finished container may be removed.

The inventive apparatus comprises a plurality of minor mold elements 40. As shown in FIGS. 4-6B, the minor mold sections are preferably disposed within the major mold sections 20 around the upper rim of each container (as is well known in the industry, open-topped containers are preferably formed two at a time, see, e.g., U.S. Pat. No. 5,026,268 to Lee—such a two container-per-cycle mold chamber is also preferably utilized in the present invention). The minor mold elements 40 may be configured in a variety of ways but as shown in FIGS. 1-3, preferably comprise a series of members having arcuate front edges running all the way around the upper lips of each container 10. The minor mold elements 40 are preferably configured in two overlying sets (i.e., one set of minor mold elements for forming a pair of thickened flanges 11 on each of the two containers 10 produced during a single processing cycle). The number of minor mold elements 40 may be varied according to the size of the container 10, the number of longitudinal/axial reinforcing ribs 12 desired, the molding characteristics of the material being utilized, etc. As shown in FIGS. 1-3, eight minor mold elements 40 perform well in the inventive apparatus. The two sets of minor mold elements 40 need not be identical, whereby two containers 10 having different arrangements and numbers of longitudinal/axial reinforced ribs 12 may be formed in each processing cycle. Furthermore, if it is desired to form more than two thickened radial flanges 11 per container 10, multiple sets of minor mold elements 40 may be longitudinally arrayed near the upper lip of a single container (i.e., since each set of minor mold elements 40 may form two thickened flanges 11). Furthermore, if desired, sets of minor mold elements 40 may be positioned at other points along the container 10 sidewall (e.g., near the bottom of the containers 10) to form additional reinforcing flanges 11.

As shown in FIGS. 1 and 3, the minor mold elements 40 are preferably configured to not be in radial contact with each other when in their radially-outermost position. This configuration allows for the formation of the axial/longitudinal reinforced ribs when the set of minor mold elements 40 are moved radially inward. Alternatively, however, if it is desired not to form any axial/longitudinal reinforced ribs 12, curved minor mold elements 40 (e.g., configured in a diaphragm or shutter-like fashion) may be employed. However, for both simplicity of the molding apparatus and the resultant strength imparted to the container 10 by the axial reinforced ribs 12, minor mold elements 40 configured as per FIGS. 1-3 are preferred.

Figure 4:
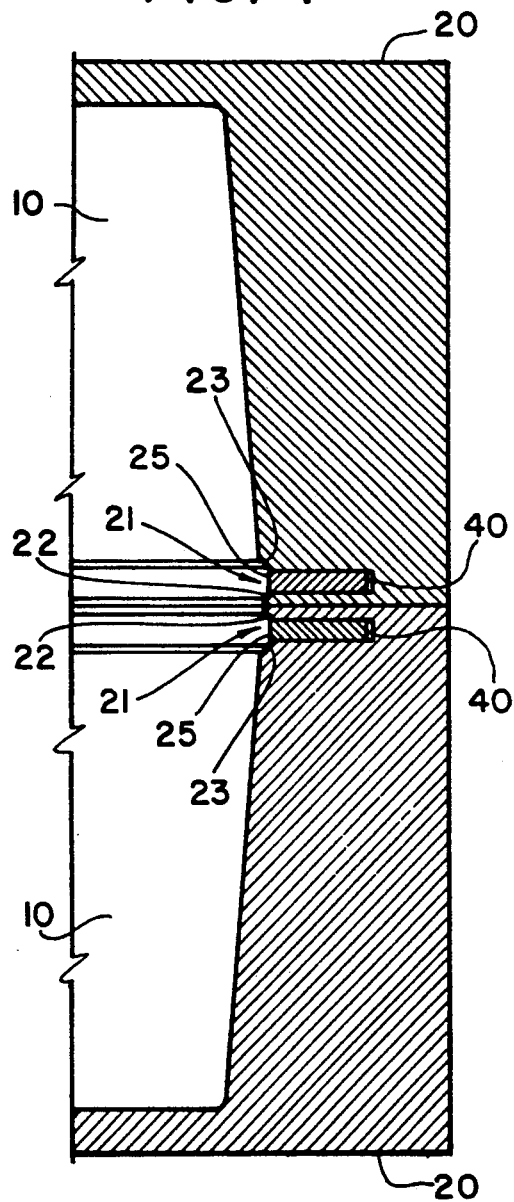
FIG. 4 is a fragmentary sectional view of the major and minor mold elements showing the channel-shaped annular projection in the blow-molded material with the minor mold elements retracted.
Figure 5:
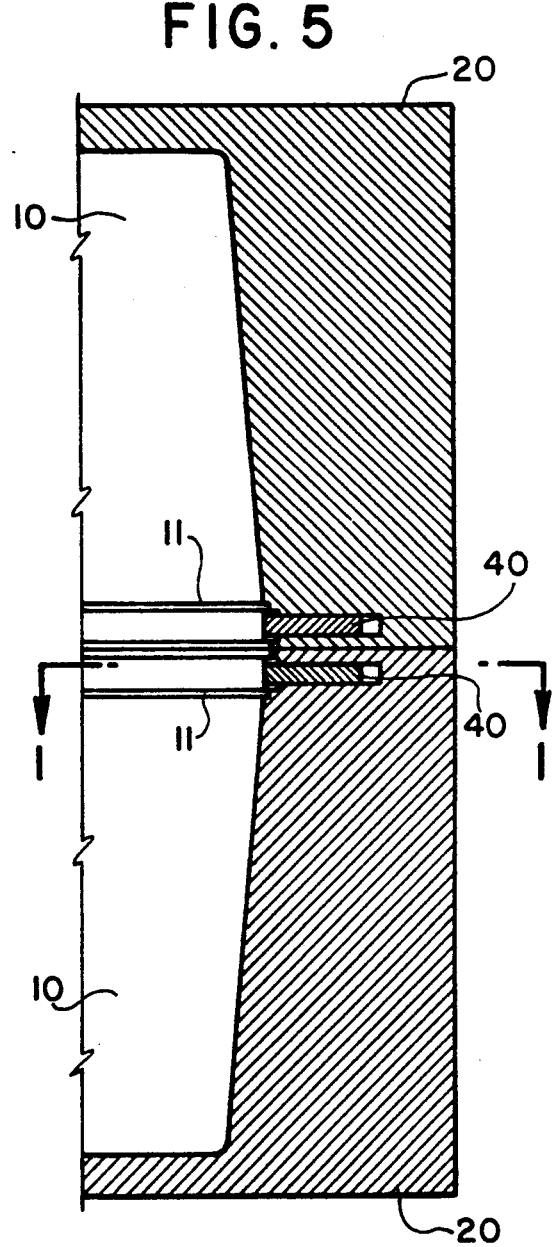
FIG. 5 is a fragmentary sectional view of the major and minor mold elements showing the channel-shaped annular projection in the blow-molded material with the minor mold elements radially extended, showing the formation of two pairs of thickened flanges (one pair on each container)

As shown in FIG. 4, the minor mold elements 40 are preferably disposed within channel-shaped annular projections 21 within the major mold elements 20. The vertical or axial surface 25 of the channel-shaped annular projection 21 overlies the innermost or front surface of the minor mold elements 40. The channel-shaped annular projections 21 are preferably axially bounded by upper 22 and lower 23 radial projections. As shown in FIG. 5, when the minor mold elements 40 are extended radially inward, the upper 22 and lower 23 radial projections constrain the movement of the blow-molded thermoplastic material 90, encouraging contact and bonding of the two layers of material to form the pair of thickened flanges 11.

Figure 6A:
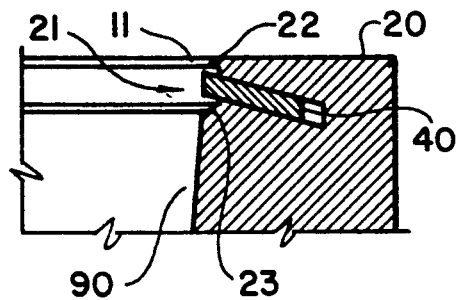
FIG. 6A is a fragmentary sectional view of the major and minor mold sections showing an alternate arrangement of the minor mold elements whereby an enlarged upper flange is formed.
Figure 6B:
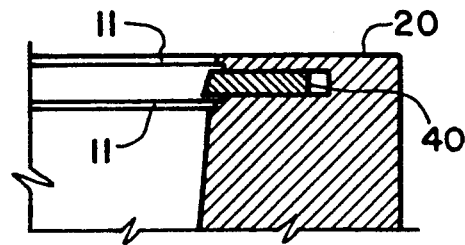
FIG. 6B is a fragmentary sectional view of the major and minor mold sections showing a second alternate arrangement of the minor mold elements whereby the minor mold elements have non-vertical front surfaces.

As is well known in the art, the minor mold elements 40 may be radially moved by any suitable means (e.g., mechanical, electrical, hydraulic, pneumatic, etc.). Since only the minor mold elements 40 are moved during the formation of the thickened flanges 11, the energy required to produce the present containers is much less than in conventional processes. As shown in FIGS. 4-6A, the forwardmost edge of the minor mold elements 40 is preferably parallel to the longitudinal axis of the container 10 (and the mold chamber). As shown in FIG. 6B, however, it is also possible to configure the inventive molding apparatus to include minor mold elements 40 having front edges which are not vertical (i.e., not parallel to the axis of the container).

As shown in FIGS. 4 and 5, the minor mold elements 40 are preferably disposed perpendicularly relative to the longitudinal axis of the containers 10. This orientation forms a pair of thickened flanges 11 which are substantially equal in size and which are both also perpendicularly disposed relative to the longitudinal axis of the containers 10 (i.e., the thickened flanges 11 are substantially parallel to the bottoms of the containers). Alternatively, however, as shown in FIG. 6A, the minor mold elements 40 may be oriented at a non-90° angle to the longitudinal axis of the containers 10. This alternate orientation causes the two thickened flanges 11 formed by the radial movement of the minor mold sections 40 to be dissimilar. For example, with the embodiment of the apparatus shown in FIG. 6A, because of the obtuse angle between the upper surface of the minor mold element 40 and the vertical plane of the major mold element 20, a large amount of the blow-molded material 90 is folded over and bonded to itself by the movement of the minor mold elements 40, thereby forming an enlarged thickened flange 11 (relative to the thickened flanges 11 produced by the apparatus of FIGS. 4 and 5). As seen in FIG. 6A, the upper flange formed by this embodiment of the apparatus is also somewhat "tear drop" shaped in radial cross-section. As also seen in FIG. 6A, in this alternate embodiment of the apparatus, the lower thickened flange is smaller than the upper flange (and also smaller than the flanges formed by the apparatus of FIGS. 4 and 5). Furthermore, the individual layers of thermoplastic material 90 in the lowered flange may not be fully bonded together by this embodiment of the apparatus. A wide variety of other angular orientations (in combination with minor mold sections having either vertical or non-vertical front surfaces) may be used as the situation dictates.

The orientation of the minor mold elements 40 may be varied widely depending upon the type of thickened flanges 11 desired. It is even possible to orient the two rings of minor mold elements (i.e., one per container 10 being formed per process cycle) within the mold chamber differently, whereby two containers having dissimilar thickened flanges 11 may be formed in each process cycle. It is also possible to alter the size of the channel-shaped annular projection 21 and the size and orientation of the upper 22 and lower 23 radial projections to produce thickened flanges 11 of varying configurations.

(b) Process

In the inventive process, a suitable amount of moldable thermoplastic material is brought into the mold chamber by any suitable method (e.g., extrusion). Thereafter, the major mold sections 20 are closed around the parison of material (thereby capturing a tail of material at the junction of the major mold sections) and the thermoplastic material is expanded to fill the mold chamber (i.e., whereby the thermoplastic material comes in contact with the major and minor mold elements—by any suitable process, e.g., blow-molding, vacuum or a combination thereof—more preferably, by blow-molding). As shown in FIGS. 1 and 4, at this initial stage of the process, the minor mold elements 40 are retracted (i.e., away from the longitudinal axis of the containers 10). Once the minor mold elements have been positioned in this fashion, the thermoplastic material 90 is brought into contact with the major and minor mold elements as shown in FIG. 4, thereby overlaying the channel-shaped annular projection 21 with thermoplastic material 90.

In the second stage of the process, while at least the thermoplastic material 90 in the vicinity of the minor mold elements 40 is still moldable, the minor mold elements 40 are moved radially inward (i.e., towards each other). As shown in FIG. 5, this movement causes the thermoplastic material within the upper and lower portions of the channel-shaped annular projection 21 to contact each other. The pressure exerted upon the two folded-over layers of material by the minor mold elements 40 in conjunction with the upper 22 and lower 23 radial projections (combined with the residual heat of the material 90) substantially bonds the two layers of material together to form a pair of integral thickened flanges 11.

Figure 9:
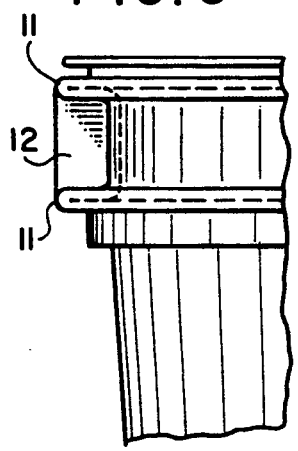
FIG. 9 is a detailed side view of the finished thickened flanges of the present invention (as per FIG. 7)
Figure 10:
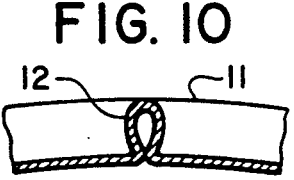
FIG. 10 is a detailed top plan sectional view of one of the axial/longitudinal reinforcing ribs of the present invention (as per FIG. 8).
Figure 8:
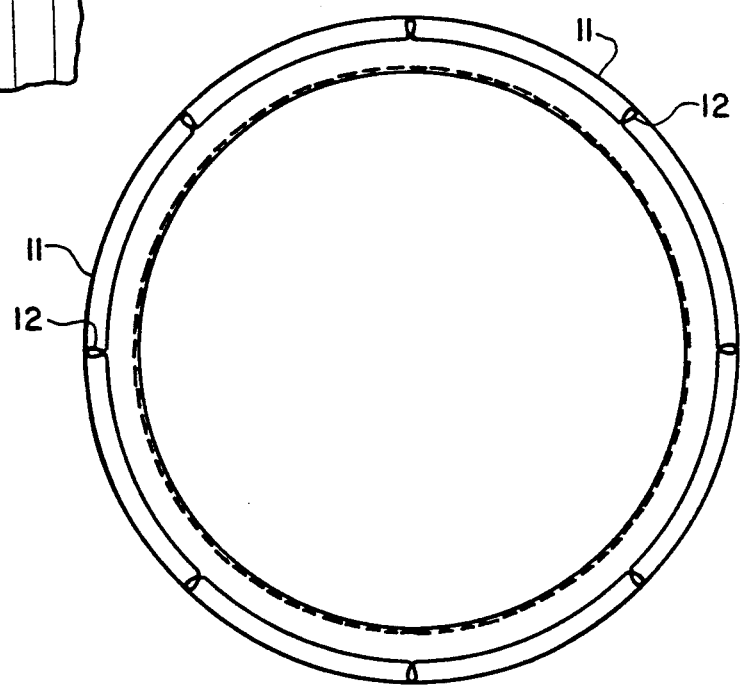
FIG. 8 is a top sectional plan view of a finished container taken along line 8—8 of FIG. 7 showing several axial/longitudinal reinforcing ribs.

Depending upon the span of movement undertaken by the minor mold elements 40 and the configuration of the channel-shaped annular projection 21 and the upper 22 and lower 23 radial projections, the thickened flanges 11 may be up to substantially twice as thick as a single layer of blow-molded material 90 (see FIG. 9). Furthermore, as seen in FIG. 6A, when the minor mold elements 40 are oriented at an obtuse angle relative to the sidewall of the container, it may be possible to form one thickened flange 11 which is even thicker than two layers of blow-molded material 90.

As noted above, the bonding of the layers of thermoplastic material/creation of the thickened flanges 11 preferably occurs while the thermoplastic material is still moldable. If necessary, auxiliary heating of the minor mold elements 40 may be utilized to facilitate this bonding. Preferably, however, auxiliary heating will not be necessary. Secondary heating of the thermoplastic material 90 is preferably avoided since an additional "heating/setting" history may be imparted to the material during reheating, thereby weakening the resultant containers. Furthermore, although it is also possible to differentially heat some sections of the mold—see, e.g., U.S. Pat. No. 4,117,062 to Uhlig, column 2, lines 45–56, this is preferably also avoided in order to minimize machinery complexity and cost. Rather, the natural heat retention of the thermoplastic material 90 and speed of the minor mold elements 40 will preferably be sufficient to ensure good bonding of the two layers of material forming the thickened flanges 11. Furthermore, it is expected (because of the relatively smaller size of the minor mold elements 40, and perhaps, because of the use of less heat-conductive materials and the lack of internal liquid coolant channels within the minor mold elements 40) that the minor mold elements 40 may retain somewhat more heat than the major mold elements 20 (especially after a few process cycles). This residual heat will further assist bonding of layers/flange formation.

As seen in FIG. 2, as the minor mold elements 40 are moved radially inward, residual blow-molded material 90 will be trapped and compacted at the interstitial spaces 41 between the minor mold elements 40 (i.e., because the circumference of the channel-shaped annular projection 21 is decreased as the minor mold elements 40 move inwardly, excess material is generated). The layers of material 90 within the interstitial spaces 41 are also substantially bonded together by the motion of the minor mold elements 40 to form the longitudinal or axial ribs 12. Since, as shown in FIGS. 7 through 10, the axial ribs 12 preferably contact both of the thickened flanges 11 and the body of the container 10, they can add substantial strength and resiliency to the molded container 10. Because of the generally triangular shape of the interstitial spaces 41, the axial ribs 12 will also have a generally triangular, or "tear drop", shape (when viewed in cross-section from a direction parallel to the length of the containers and the mold cavity—see FIGS. 8 and 10). That is, the reinforcing ribs 12 are thickest at the outer portions thereof and thinnest at the inner face thereof (i.e., where the reinforcing ribs 12 meet the body of the container 10). This configuration further augments the added strength provided to the containers 10 by the reinforcing ribs 12. Since one reinforcing rib 12 is formed per minor mold element 40, the strength requirements of the particular containers 10 being formed will play a large part in deciding upon the desired number of reinforcing ribs 12, and hence, minor mold elements 40 used in a particular application of the inventive process and apparatus.

In the third step of the process, after a suitable cooling time to allow setting of the material 90 constituting the container 10 (and especially, the thickened flanges 11), the air pressure in the mold chamber is allowed to dissipate (e.g., down from about 60 psi, which is commonly used during blow-molding). As shown in FIG. 3, the minor mold elements 40 are thereafter retracted (i.e., moved radially apart). Thereafter, the major mold sections 20 are opened (i.e., vertically along the centerline of the containers-see FIG. 3A) and the molded containers 10 are released from the mold chamber. Since, at this point in the process, the minor mold elements 40 are already retracted within the channel-shaped annular projections 21, the apparatus is ready for the next processing cycle.

As will be well known to those of skill in the blow molding art, the particular time necessary for each step (and the total cycle time required to make each pair of containers 10) will vary widely and depend upon such variables as container size, wall thickness, mold temperature, material molded, etc. In general, however, because the thickened flanges of the present containers are preferably made without axial movement of the major mold sections 40 (but rather, through radial movement of the minor mold sections 20), at a minimum, it is expected that the inventive process and apparatus will have equivalent cycle times relative to those achieved with prior art devices.

Post-molding processing and handling of the containers 10 is facilitated by the preservation of the tail of material (there may also be some residual thermoplastic material 90 on the end of the joined containers opposite to the tail—e.g., at the extruder outlet, which may further facilitate post-release handling). For example, the containers 10 will need to be conveyed to a trimming machine to separate the two containers molded by each process cycle. The tail of material may allow this transport to be accomplished without touching the thermoplastic material 90 of the containers 10 (which, although no longer moldable, may still be tacky, easy to mar and easily collapsible).

After being released from the mold chamber, the two containers 10 formed per process cycle are separated by an appropriate conventionally-known method e.g., a trim machine. More preferably, thermoplastic material is used in the present process, whereby the scrap material produced by trimming may be recycled. Additional finishing steps (e.g., detaching the tail of material and forming drainage holes in the containers) may also be accomplished as appropriate.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. For example, although the formation of cylindrical containers has been described in detail, the inventive process and apparatus may clearly also be used to produce containers of other shapes, e.g., square. The foregoing disclosure is not intended or to be construed to limit the present invention or otherwise to exclude any such other embodiments, adaptations, variations, modifications and equivalent arrangements, the present invention being limited only the claims appended hereto and the equivalents thereof.

I claim:

1. A process for molding material into a joined pair of containers, each of said containers having a pair of thickened flanges, said process comprising the steps of:
   (a) capturing a parison of moldable material between a plurality of separable major mold elements and a plurality of minor mold elements, said mold elements enclosing a mold chamber;
   (b) expanding said parison of material to contact said major and minor mold elements;
   (c) moving said minor mold elements radially inward towards each other and towards the axial center line of said mold chamber to contact and substantially bond together adjacent layers of said expanded parison of material, thereby forming said thickened flanges; and
   (d) releasing said pair of containers from said major and minor mold elements.

2. The molding process of claim 1 wherein said capturing step includes capturing a residual tail of material between the juncture of said major mold elements.

3. The molding process of claim 2 wherein said tail of material remains attached to said pair of containers during the formation of said thickened flanges.

4. The molding process of claim 1 wherein said minor mold elements comprise two sets of matched minor mold elements, said sets of minor mold elements being disposed around the rims of said containers.

5. The molding process of claim 4 wherein, said moving step (c), said minor mold elements move inwardly perpendicular to the longitudinal axis of said containers.

6. The molding process of claim 4 wherein, in said moving step (c), said minor mold elements move inwardly at a non-90° angle relative to the longitudinal axis of said containers.

7. The molding process of claim 4 wherein said releasing step (d) comprises radially retracting and moving apart said minor mold elements and separating said major mold elements.

8. The molding process of claim 1 wherein said moving step (c) also forms a series of longitudinally-oriented reinforcing ribs disposed between each respective pair of thickened flanges, said reinforcing ribs being disposed at the interstitial spaces between said minor mold elements.

9. The molding process of claim 8 wherein said longitudinally-oriented reinforcing ribs have a tear-drop configuration, whereby said reinforcing ribs are thinnest where they join the body portion of said container.

10. A process for molding material into a pair of containers, each of said containers having a pair of thickened flanges, said process comprising the steps of:
    (a) capturing a parison of moldable material between a plurality of separable major mold elements and a plurality of minor mold elements, said mold elements enclosing a mold chamber;
    (b) expanding said parison of material to contact said major and minor mold elements, thereby forming a joined pair of containers;
    (c) moving said minor mold elements radially inward towards each other and towards the axial center line of said mold chamber to contact and substantially bond together adjacent layers of said expanded parison of material, thereby forming said thickened flanges;
    (d) releasing said joined pair of containers from said major and minor mold elements; and
    (e) separating said joined pair of containers from each other.

* * * * *